US012627006B2

(12) United States Patent (10) Patent No.: US 12,627,006 B2
Wu et al. (45) Date of Patent: May 12, 2026

(54) ELECTRODE ASSEMBLY

(71) Applicant: Hithium Tech HK Limited, Kowloon (HK)

(72) Inventors: Congmiao Wu, Fujian (CN); Haishi Zeng, Fujian (CN); Pan Tang, Fujian (CN); Ninghui Zhang, Fujian (CN); Youzhi Zhu, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 803 days.

(21) Appl. No.: 17/963,432

(22) Filed: Oct. 11, 2022

(65) Prior Publication Data

US 2023/0116145 A1 Apr. 13, 2023

(30) Foreign Application Priority Data

Oct. 12, 2021 (CN) .......................... 202111188964.X
Oct. 12, 2021 (CN) .......................... 202122457763.7

(51) Int. Cl.
H01M 50/538 (2021.01)
H01M 10/04 (2006.01)
(Continued)

(52) U.S. Cl.
CPC ..... H01M 50/538 (2021.01); H01M 10/0431 (2013.01); H01M 10/052 (2013.01); H01M 10/0587 (2013.01); *H01M 2220/20* (2013.01)

(58) Field of Classification Search
CPC .............. H01M 4/13; H01M 10/0431; H01M 10/052; H01M 10/0525; H01M 50/538; H01M 2220/20
(Continued)

(56) References Cited

U.S. PATENT DOCUMENTS

2017/0203654 A1* 7/2017 He ............................ B60L 7/10
2020/0020952 A1* 1/2020 Zhang ..................... H01M 4/70

FOREIGN PATENT DOCUMENTS

CN 111180664 A * 5/2020 ............. H01M 4/664
CN 210805919 U * 6/2020 .......... H01M 50/536
(Continued)

OTHER PUBLICATIONS

CN 210805919 U—Machine translation, retrieved on Jun. 2025 (Year: 2025).*
(Continued)

*Primary Examiner* — James M Erwin
*Assistant Examiner* — Gilberto Ramos Rivera
(74) *Attorney, Agent, or Firm* — Hodgson Russ LLP

(57) ABSTRACT

An electrode assembly is provided in the disclosure. The electrode assembly includes a positive electrode and a negative electrode. The positive electrode includes a first insulating layer, a first conductive layer on one surface of the first insulating layer and a second conductive layer on the other surface of the first insulating layer, a first active material layer on a surface of the first conductive layer, and a second active material layer on a surface of the second conductive layer. The negative electrode includes a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer.

20 Claims, 7 Drawing Sheets

(51) Int. Cl.
  *H01M 10/052*       (2010.01)
  *H01M 10/0587*      (2010.01)
(58) Field of Classification Search
  USPC ......................................................... 429/209
  See application file for complete search history.

(56)             References Cited

FOREIGN PATENT DOCUMENTS

CN        213546523        6/2021
CN        113078370        7/2021
CN        216818412        6/2022
KR        20150016018  A  *  2/2015  .......... H01M 10/058
WO        2012118127       9/2012

OTHER PUBLICATIONS

CN111180664A—Machine translation, retrieved on Jul. 2025 (Year: 2025).*
KR20150016018A—Machine translation, retrieved on Jul. 2025 (Year: 2025).*
CNIPA, First Office Action for CN Application No. 202111188964.X, Apr. 12, 2025.

* cited by examiner

Length Direction 152    151    153    154    16

152    151    153    154

152    151    153    154

ELECTRODE ASSEMBLY

CROSS-REFERENCE TO RELATED APPLICATION(S)

This application claims priority under 35 U.S.C. § 119(a) to and the benefit of Chinese Patent Application Serial No. 202122457763.7, filed Oct. 12, 2021, and Chinese Patent Application Serial No. 202111188964.X, filed Oct. 12, 2021, the entire disclosures of which are hereby incorporated by reference.

TECHNICAL FIELD

This application relates to the technical field of batteries, and in particular, to an electrode assembly.

BACKGROUND

At present, common lithium batteries generally use aluminum foil and copper foil as positive and negative electrodes, and battery performance of this type of lithium battery is more prone to defects.

SUMMARY

In a first aspect, an electrode assembly is provided in the implementations of the disclosure. The electrode assembly includes a positive electrode and a negative electrode. The positive electrode includes a first insulating layer, a first conductive layer on one surface of the first insulating layer and a second conductive layer on the other surface of the first insulating layer, a first active material layer on a surface of the first conductive layer, and a second active material layer on a surface of the second conductive layer. The negative electrode includes a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer. The positive electrode and the negative electrode which are adjacent to each other are separated by a separator. A current in the first conductive layer of the positive electrode is outputted through a first tab. A current in the second conductive layer of the positive electrode is outputted through a second tab. A current in the third conductive layer of the negative electrode is outputted through a third tab. A current in the fourth conductive layer of the negative electrode is outputted through a fourth tab.

In a second aspect, a battery pack is provided. The battery pack includes a battery box and multiple electrode assemblies provided in the first aspect, where the multiple electrode assemblies are received in the battery box.

In a third aspect, a vehicle is provided. The vehicle includes a processor and a battery pack provided in the second aspect. The battery pack is electrically coupled with the processor. The processor is configured to control charging and discharging of each of the multiple electrode assemblies.

BRIEF DESCRIPTION OF THE DRAWINGS

In order to describe technical solutions of implementations of the disclosure more clearly, the following will give a brief introduction to the accompanying drawings used for describing the implementations. It should be appreciated that the accompanying drawings hereinafter described are merely some implementations of the disclosure and should not be deemed limitations on the scope. Based on these drawings, those of ordinary skill in the art can also obtain other drawings without creative effort.

REFERENCE SIGNS

10: electrode assembly; 11: positive electrode; 111: first insulating layer; 112: first conductive layer; 113: second conductive layer; 114: first active material layer; 115: second active material layer; 12: negative electrode; 121: second insulating layer; 122: third conductive layer; 123: fourth conductive layer; 124: third active material layer; 125: fourth active material layer; 13: first separator; 14: second separator; 151: first tab; 152: second tab; 153: third tab; 154: fourth tab; 16: symmetry plane; 20: battery pack; 200: battery box; 30: vehicle; 300: processor.

DETAILED DESCRIPTION

In order to make objects, technical solutions, and advantages of implementations of the disclosure more clearly, the technical solutions in the implementations of the disclosure are clearly and completely described in the following with reference to the accompanying drawings in the implementations of the disclosure. Apparently, the described implementations are merely a part of rather than all the implementations of the disclosure. Generally, components of the implementations of the disclosure described and illustrated in the accompanying drawings herein may be arranged and designed by various configurations.

Accordingly, implementations of the disclosure provided in the accompanying drawings are described in detail hereinafter for merely describing selected implementations of the disclosure rather than intending to limit the scope of the disclosure. All other implementations obtained by those of ordinary skill in the art based on the implementations of the disclosure without creative efforts shall fall within the protection scope of the disclosure.

In addition, conventional conditions or conditions recommended by the manufacturer were followed, unless specific conditions are otherwise specified. Reagents or instruments without manufacturers specified are conventional products that can be obtained through market purchase.

"Solution A and/or solution B" refers to solution A or solution B, or a combination of solution A and solution B.

Implementations of the disclosure aim to provide an electrode assembly, which can overcome performance defects of lithium batteries in the related art.

An electrode assembly 10 according to the implementations of the disclosure are described in detail hereinafter.

Figure 1:
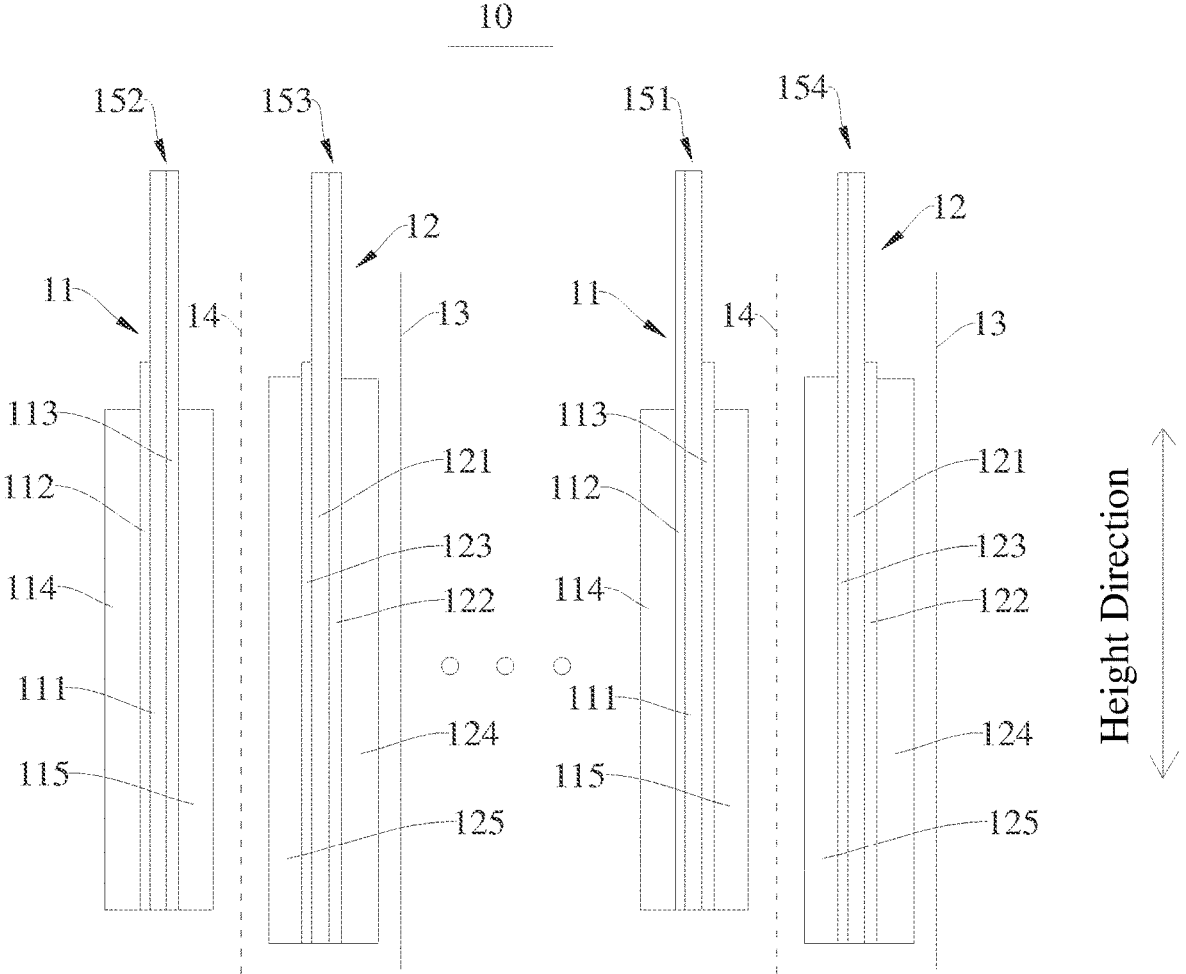
FIG. 1 is a cross-sectional view of an electrode assembly according to implementations of the disclosure.
Figure 9:
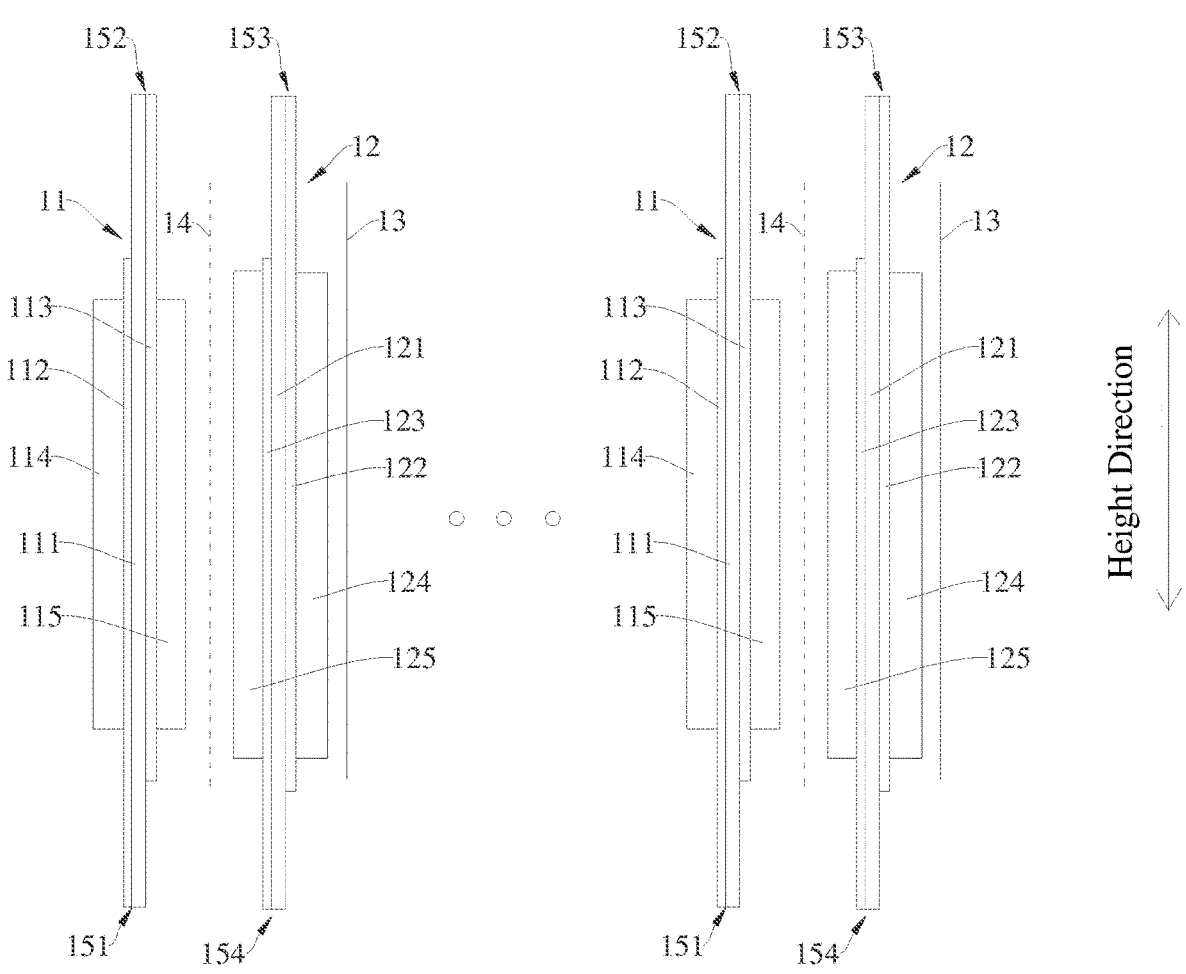
FIG. 9 is a cross-sectional view of an electrode assembly according to another implementation of the disclosure.

In a first aspect, an electrode assembly 10 is provided. The electrode assembly 10 includes a positive electrode 11 and a negative electrode 12 (as illustrated in FIG. 1 and FIG. 9). In some implementations, the electrode assembly 10 may have a wound structure or a stacked structure.

The positive electrode 11 includes a first insulating layer 111, a first conductive layer 112 on one surface of the first insulating layer 111 and a second conductive layer 113 on the other surface of the first insulating layer 111, a first active material layer 114 on a surface of the first conductive layer 112, and a second active material layer 115 on a surface of the second conductive layer 1123.

The negative electrode 12 includes a second insulating layer 121, a third conductive layer 122 on one surface of the second insulating layer 121 and a fourth conductive layer 123 on the other surface of the second insulating layer 121, a third active material layer 124 on a surface of the third conductive layer 122, and a fourth active material layer 125 on a surface of the fourth conductive layer 123.

The positive electrode 11 and the negative electrode 12 which are adjacent to each other are separated by a separator.

A current in the first conductive layer 112 of the positive electrode 11 is outputted through a first tab 151. A current in the second conductive layer 113 of the positive electrode 11 is outputted through a second tab 152.

A current in the third conductive layer 122 of the negative electrode 12 is outputted through a third tab 122. A current in the fourth conductive layer 123 of the negative electrode 12 is outputted through a fourth tab 123.

The electrode assembly 10 includes the positive electrodes 11 and the negative electrodes 12 arranged alternately. The positive electrode 11 is separated from the negative electrode 12 adjacent to the positive electrode by the separator. During charging and discharging cells, either of the first active material layer 114 and the second active material layer 114, either of the third active material layer 124 and the fourth active material layer 125, and the separator can form a Li-ion cell. With aid of the first insulating layer 111 and the second insulating layer 121, Li-ion cells formed can be separated with one another. The current in the first conductive layer 112 is outputted through the first tab 151, the current in the second conductive layer 113 is outputted through the second tab 152, the current in the third conductive layer 153 is outputted through a third tab 153, and the current in the fourth conductive layer 123 is outputted through a fourth tab 154, such that the entire electrode assembly 10 can be regarded as multiple independent Li-ion cells, and the multiple independent Li-ion cells do not share a same current collector and corporately determine performance of the entire electrode assembly 10. By designing performances of the multiple independent Li-ion cells, performance deficiencies of a lithium battery can be overcome.

The first tab 151, the second tab 152, the third tab 153, and the fourth tab 154 each correspond to one distinct conductive layer respectively. Tabs at the same position correspond to the same conductive layer. As an example, multiple first tabs 151, multiple second tabs 152, multiple third tabs 153, and multiple fourth tabs 154 may be provided. Tabs at the same position are connected by welding or other connection methods, such that currents in multiple first conductive layers 112, currents in multiple second conductive layers 113, currents in multiple third conductive layers 122, and currents in multiple fourth conductive layers 123 may be collected separately. The first conductive layers 112, the second conductive layer 113, the third conductive layer 122, and the fourth conductive layer 123 do not interfere with each other during current collection via the tabs, and two independent Li-ion cells can be completely separated.

As an example, the first active material layer 114, the third active material layer 124, and the separator can form an independent Li-ion cell. The second active material layer 115 and the fourth active material layer 125 can form an independent Li-ion cell. The first active material layer 114 and the fourth active material layer 125 can form an independent Li-ion cell. The second active material layer 115 and the third active material layer 124 can form an independent Li-ion cell. In the entire electrode assembly 10, the positive electrodes and the negative electrodes can be arranged and combined in various ways to form at least two of above types of cells.

As an example, the third active material layer 124 and the first active material layer 114 adjacent to the third active material layer 124 are separated by a first separator 13. The second active material layer 115 and the fourth active material layer 125 adjacent to the second active material layer 115 are separated by a second separator 14. In the electrode assembly 10, the first active material layer 114, the first conductive layer 112, the first insulating layer 111, the second conductive layer 113, the second active material layer 115, the second separator 14, the fourth active material layer 125, the fourth conductive layer 123, the second insulating layer 121, the third conductive layer 122, the third active material layer 124, and the first separator 13 are sequentially stacked, and such stacked structure is repeated.

In other implementations, the first active material layer 114, the first conductive layer 112, the first insulating layer 111, the second conductive layer 113, the second active material layer 115, the separator, the third active material layer 124, the third conductive layer 122, the second insulating layer 121, the fourth conductive layer 123, the fourth active material layer 125, and the separator can also be sequentially stacked, and such stacked structure is repeated.

In an implementation, a capacity ratio of either of the third active material layer 124 and the fourth active material layer 125 to either of the first active material layer 114 and the second active material layer 115 ranges from 1.07 to 1.2, which allows lithium ions to move from the positive electrode to the negative electrode of the Li-ion cell without lithium plating. Here, the capacity ratio can be referred to as cell balance (CB) or capacity ratio of negative to positive electrodes (N/P ratio). As an example, the capacity ratio is 1.07, 1.08, 1.09, 1.1, 1.12, 1.14, 1.15, 1.16, 1.18, or 1.2.

In a possible implementation, the first tab 151 and the second tab 152 are staggered. A part of the first conductive layer 112 and a part of first insulating layer 111 extend to form the first tab 151. A part of the second conductive layer 113 and a part of first insulating layer 111 extend to form the second tab 152.

The third tab 153 and the fourth tab 154 are staggered. A part of the third conductive layer 122 and a part of the second insulating layer 113 extend to form the third tab 153. A part of the fourth conductive layer 123 and a part of the second insulating layer 113 extend to form the fourth tab 154.

In other implementations, the first tab 151 can be welded with the first conductive layer 112, and the second tab 152 can be welded with the second conductive layer 113, the third tab 153 can be welded with the third conductive layer 122, the fourth tab 154 can be welded with the fourth conductive layer 123, so that the current in the first conductive layer 112, the current in the second conductive layer 113, the current in the third conductive layer 122, and the current in the fourth conductive layer 123 can be outputted respectively.

For example, as illustrated in the electrode assembly 10 of FIG. 1, the third active material layer 124 and the first active material layer 114 adjacent to the third active material layer 124 are separated by the first separator 13, the second active material layer 115 and the fourth active material layer 125 adjacent to the second active material layer 115 are separated by the second separator 14.

Figure 10:
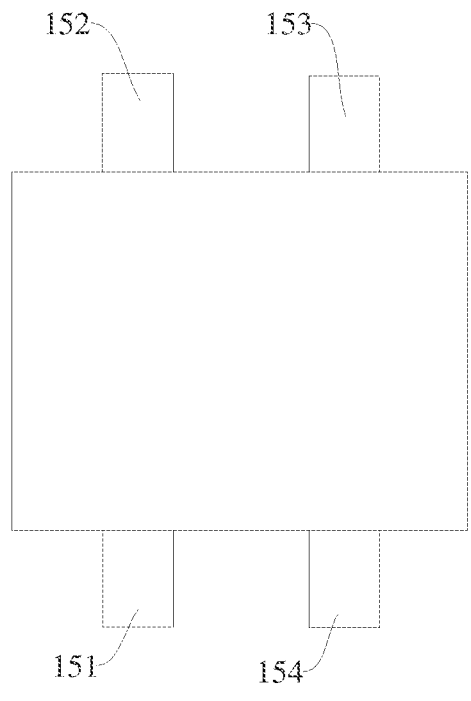
FIG. 10 illustrates an arrangement of tabs of an electrode assembly according to another implementation of the disclosure.
Figure 11:
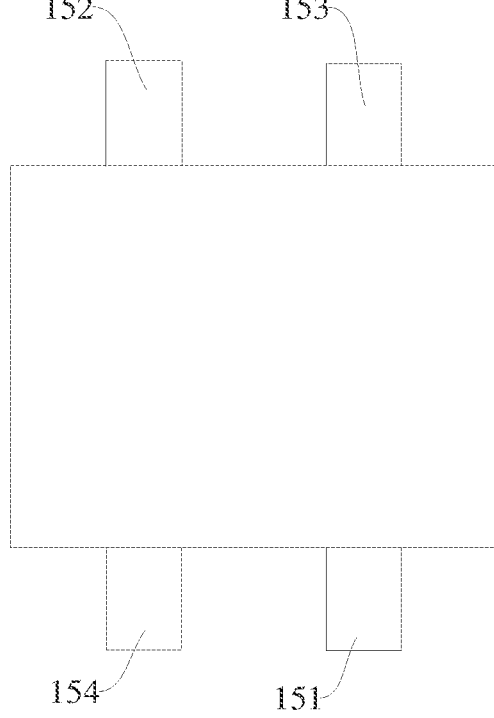
FIG. 11 illustrates an arrangement of tabs of an electrode assembly according to another implementation of the disclosure.

When the electrode assembly 10 has a wound structure or a stacked structure, the first tab 151, the second tab 152, the third tab 153, and the fourth tab 154 can be arranged at a same side in a height direction of the electrode assembly 10 (as illustrated in FIGS. 1-8), or at opposite sides in the height direction of the electrode assembly 10 (as illustrated in FIGS. 9-11).

When the electrode assembly 10 has a wound structure, and the first tab 151, the second tab 152, the third tab 153, and the fourth tab 154 are arranged at the same side in the height direction of the electrode assembly 10, the tabs can be arranged in various mays. Arrangements of the tabs include the following.

Figure 2:
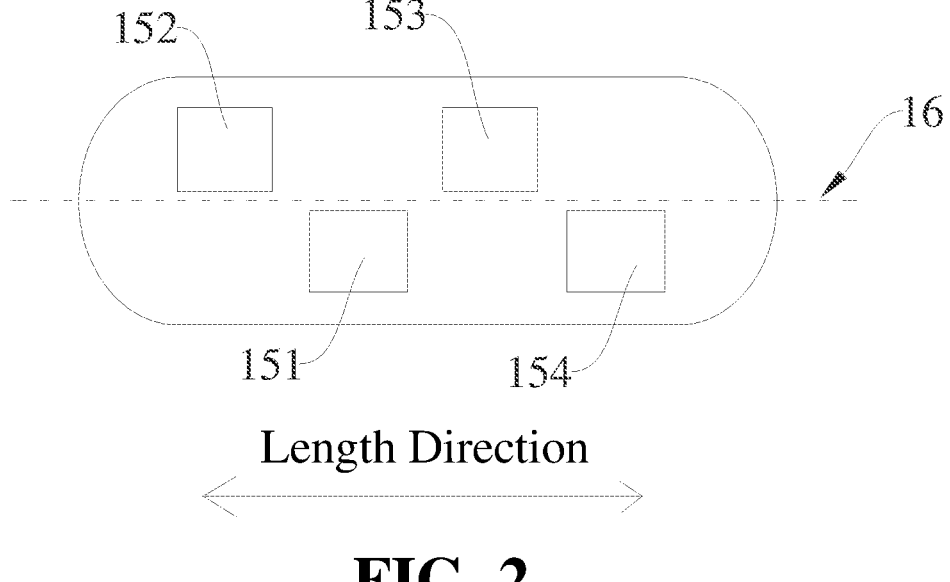
FIG. 2 illustrates an arrangement of tabs of an electrode assembly according to an implementation of the disclosure.

(1) As illustrated in FIG. 2, the first tab 151 and the fourth tab 154 are arranged at one side of a symmetry plane 16 of the electrode assembly 10. The second tab 152 and the third tab 153 are arranged at the other side of the symmetry plane 16. The symmetry plane 16 is parallel to the height direction and a length direction of the electrode assembly 10. The first tab 151 is disposed between the second tab 152 and the third tab 153 in the length direction of the electrode assembly 10.

Figure 3:
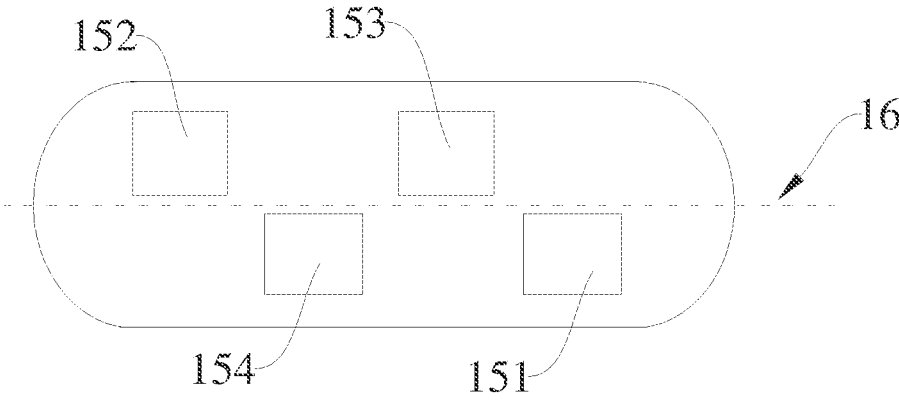
FIG. 3 illustrates an arrangement of tabs of an electrode assembly according to another implementation of the disclosure.

(2) As illustrated in FIG. 3, the second tab 152 and the third tab 153 are arranged at one side of the symmetry plane 16 of the electrode assembly 10. The first tab 151 and the fourth tab 154 are arranged at the other side of the symmetry plane 16. The symmetry plane 16 is parallel to the height direction and a length direction of the electrode assembly 10. The fourth tab 154 is disposed between the second tab 152 and the third tab 153 in the length direction of the electrode assembly 10.

Figure 4:
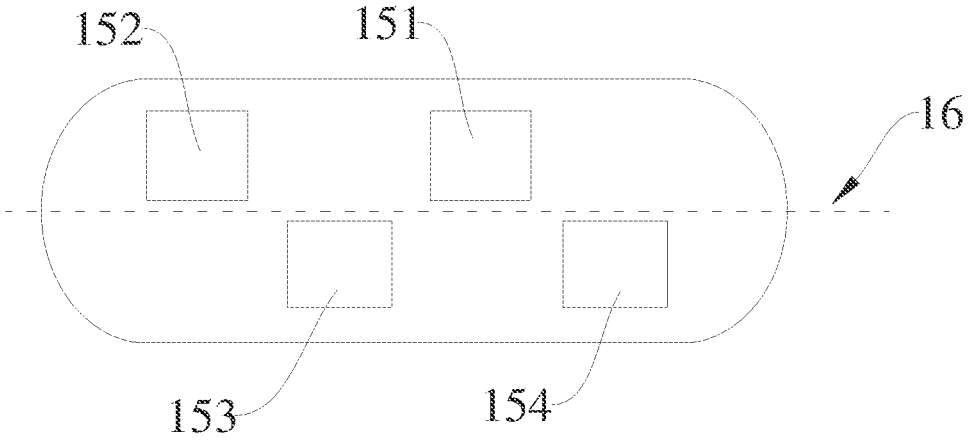
FIG. 4 illustrates an arrangement of tabs of an electrode assembly according to another implementation of the disclosure.

(3) As illustrated in FIG. 4, the first tab 151 and the second tab 152 are arranged at one side of the symmetry plane 16 of the electrode assembly 10. The third tab 153 and the fourth tab 154 are arranged at the other side of the symmetry plane 16. The symmetry plane 16 is parallel to the height direction and a length direction of the electrode assembly 10. The third tab 153 is disposed between the first tab 151 and the second tab 152 in the length direction of the electrode assembly 10.

Figure 5:
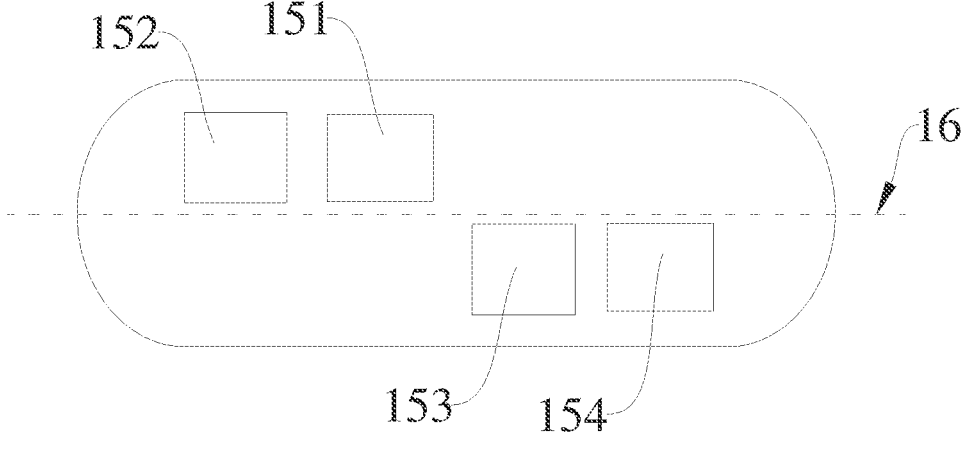
FIG. 5 illustrates an arrangement of tabs of an electrode assembly according to another implementation of the disclosure.

(4) As illustrated in FIG. 5, the first tab 151 and the second tab 152 are arranged at one side of the symmetry plane 16 of the electrode assembly 10. The third tab 153 and the fourth tab 154 are arranged at the other side of the symmetry plane 16. The symmetry plane 16 is parallel to the height direction and a length direction of the electrode assembly 10. The first tab 151 and the third tab 153 are arranged at opposite sides of the symmetry plane 16. The first tab 151 is disposed between the third tab 152 and the second tab 153 in the length direction of the electrode assembly 10.

Figure 6:
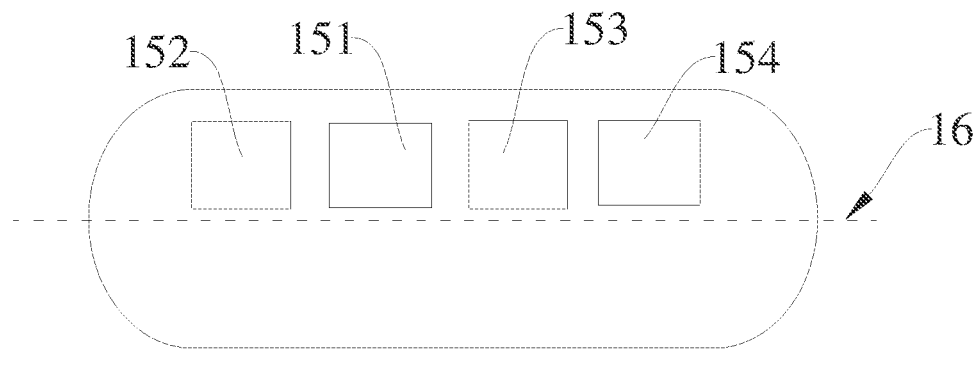
FIG. 6 illustrates an arrangement of tabs of an electrode assembly according to another implementation of the disclosure.

(5) As illustrated in FIG. 6, the first tab 151, the second tab 152, the third lab 153, and the fourth lab 154 are arranged at the same side of the symmetry plane 16 of the electrode assembly 10.

Figure 7:
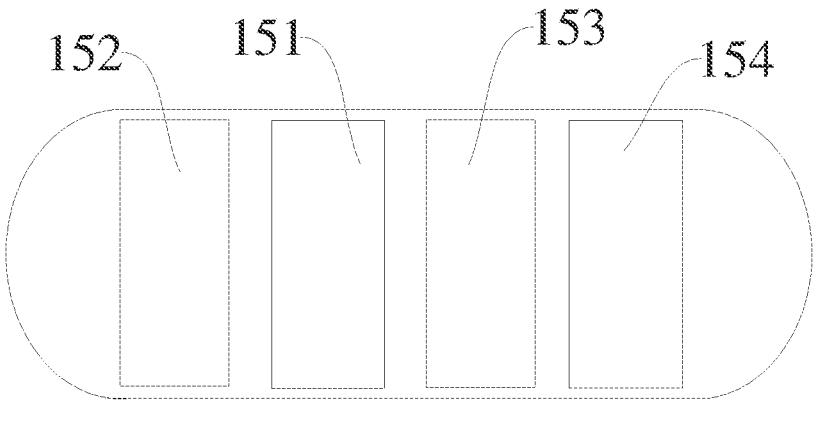
FIG. 7 illustrates an arrangement of tabs of an electrode assembly according to another implementation of the disclosure.

(6) As illustrated in FIG. 7, the first tab 151, the second tab 152, the third lab 153, and the fourth lab 154 are arranged at opposite sides of the symmetry plane 16 of the electrode assembly 10.

When the electrode assembly 10 has a wound structure, and the first tab 151, the second tab 152, the third tab 153, and the fourth tab 154 are arranged at opposite sides in the height direction of the electrode assembly 10. As an example, the tabs are arranged in a way similar to that described in above implementations (1)-(4), except that in corresponding implementations (1)-(4), the tabs arranged at one side of the symmetry plane 16 of the electrode assembly 10 and the tabs arranged at the other side of the symmetry plane 16 of the electrode assembly 10 are located at opposite sides in the height direction of the electrode assembly 10.

When the electrode assembly 10 is a stacked structure, arrangements of the tabs are described as follows.

Figure 8:
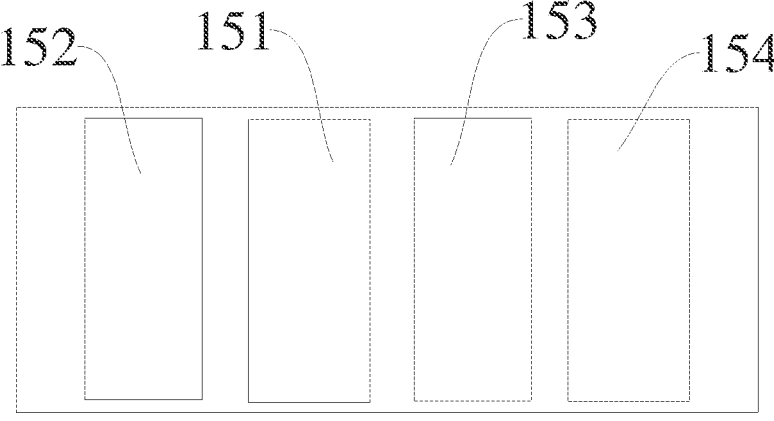
FIG. 8 illustrates an arrangement of tabs of an electrode assembly according to another implementation of the disclosure.

When the electrode assembly 10 is in a stacked structure, the first tab 151, the second tab 152, the third tab 153, and the fourth tab 154 can be arranged at the same side in the height direction of the electrode assembly 10 (as illustrated in FIG. 8), or at opposite sides in the height direction of the electrode assembly 10 (as illustrated in FIG. 10 and FIG. 11).

Further, the first active material layer 114 is different from the second active material layer 115, and/or the third active material layer 124 is different from the fourth active material layer 125. That is, the first active material layer 114 is different from the second active material layer 115, and the third active material layer 124 is different from the fourth active material layer 125. Alternatively, the first active material layer 114 is different from the second active material layer 115, or the third active material layer 124 is different from the fourth active material layer 125. As such, it makes multiple independent Li-ion cells different, and by designing performances of the multiple independent and different Li-ion cells, the performance defects of a lithium battery due to a single active material can be overcome.

It should be noted that, the first active material layer 114 is different from the second active material layer 115, which may refer to that the first active material layer 114 and the second active material layer 115 are made of different active materials, or the first active material layer 114 and the second active material layer 115 are made of the same active material but different in particle size, specific surface area, capacity per gram, or the like. It can be understood that, the first active material layer 114 and the second active material layer 115 may contain adhesives, conductive agents, etc. in addition to active materials.

No matter whether a kind of an active material of the first active material layer 114 is the same as or different from a kind of an active material of the second active material layer 115, the active material of the first active material layer 114 can be selected from lithium iron phosphate, monocrystalline nickel-cobalt lithium manganate, polycrystalline nickel-cobalt lithium manganate, lithium titanate, lithium manganite, or lithium cobalt oxide. The active material of the second active material layer 115 may also be selected from lithium iron phosphate, monocrystalline nickel-cobalt lithium manganate, polycrystalline nickel-cobalt lithium manganate, lithium titanate, lithium manganite, or lithium cobalt oxide.

In an implementation, the lithium iron phosphate in the implementations of the disclosure has a particle size distribution where D10 is greater than 0.4 μm, D50 ranges from 0.8 μm to 4 μm, and D90 ranges from 3 μm to 10 μm. The lithium iron phosphate has a specific surface area ranging from 8 $m^2/g$ to 16 $m^2/g$, and a capacity per gram ranging from 100 mAh/g to 160 mAh/g. In an implementation, the lithium iron phosphate has a compacted density ranging from 2.1 $g/cm^3$ to 2.6 $g/cm^3$, and particles are well matched.

In an implementation, the monocrystalline nickel-cobalt lithium manganate in the implementations of the disclosure has a particle size distribution where D10 is greater than 1.5 μm, D50 ranges from 4 μm to 10 μm, and D90 ranges from 9 μm to 20 μm. The monocrystalline nickel-cobalt lithium manganate has a specific surface area ranging from 0.3 $m^2/g$ to 0.6 $m^2/g$, and a capacity per gram ranging from 160 mAh/g to 210 mAh/g. In an implementation, the monocrystalline nickel-cobalt lithium manganate has a coating amount ranging from 10 mg/cm² to 26 mg/cm². In an implementation, the monocrystalline nickel-cobalt lithium manganate has a compacted density ranging from 3.2 $g/cm^3$ to 3.75 $g/cm^3$.

In an implementation, the polycrystalline nickel-cobalt lithium manganate in the implementations of the disclosure has a particle size distribution where D10 is greater than 1.5 μm, D50 ranges from 8 μm to 12 μm, and D90 ranges from 18 μm to 34 μm. The monocrystalline nickel-cobalt lithium manganate has a specific surface area ranging from 0.2 $m^2/g$ to 0.6 $m^2/g$, and a capacity per gram ranging from 165 mAh/g to 211 mAh/g. In an implementation, the polycrystalline nickel-cobalt lithium manganate has a coating amount ranging from 10 mg/cm² to 26 mg/cm². In an implementation, the polycrystalline nickel-cobalt lithium manganate has a compacted density ranging from 3.2 $g/cm^3$ to 3.6 $g/cm^3$.

In an implementation, when the active materials of the first active material layer 114 and the second active material layer 115 are the lithium iron phosphate, the monocrystalline nickel-cobalt lithium manganate, the polycrystalline nickel-cobalt lithium manganate, the lithium iron phosphate has a coating amount ranging from 5 mg/cm² to 22 mg/cm², the monocrystalline nickel-cobalt lithium manganite has a coating amount ranging from 10 mg/cm² to 26 mg/cm², and the polycrystalline nickel-cobalt lithium manganite has a coating amount ranging from 10 mg/cm² to 26 mg/cm².

The greater the coating amounts of the active materials of the first active material layer 114 and the second active material layer 115, the more difficult it is to dry, coating efficiency is low, and cracks are easy to occur. A large coating amount results in a large direct current resistance (DCR) and a large polarization, which adversely affects heat dissipation, and the electrode assembly generates a large amount of heat. However, a large coating amount can increase energy density. If the coating amount is small, a thickness of the active material is thin, a path of ion migration into an inner active material is shorten, which is beneficial to increasing a rate. The first active material layer 114 and the second active material layer 115 in the implementations of the disclosure have appropriate coating amounts of active materials, which is beneficial to improving an overall performance of the electrode assembly 10. In an example, the lithium iron phosphate has a coating amount of 5 mg/cm², 8 mg/cm², 10 mg/cm², 12 mg/cm², 15 mg/cm², 18 mg/cm², or 22 mg/cm². In an example, the monocrystalline nickel-cobalt lithium manganite and the polycrystalline nickel-cobalt lithium manganite each have a coating amount of 10 mg/cm², 12 mg/cm², 15 mg/cm², 18 mg/cm², 22 mg/cm², or 26 mg/cm².

In an example, the first active material layer 114 is different from second active material layer 115 as follows. The first active material layer 114 and the second active material layer 115 have the same kind of active material, and any one or more of the following solutions are met.

In one possible implementation, the first active material layer 114 and the second active material layer 115 have a difference in particle size D10 ranging from 0.05 μm to 0.3 μm, a difference in particle size D50 ranging from 1 μm to 4 μm, and a difference in particle size D90 ranging from 3 μm to 5 μm.

It should be noted that, in the implementations of the disclosure, particle size D10 represents a particle diameter corresponding to 10% cumulative undersize particle distribution, particle size D50 represents a particle diameter corresponding to 50% cumulative undersize particle distribution, and particle size D90 represents a particle diameter corresponding to 90% cumulative undersize particle distribution.

An active material with a large particle size has long ion migration path but a low rate, and an active material with a small particle size has a good rate and is not easy to form dead zone inside particles and has long cycle life. By setting the active material of the first active material layer 114 and the active material of the second active material layer 115 to have a difference in particle size D10 ranging from 0.05 μm to 0.3 μm, a difference in particle size D50 ranging from 1 μm to 4 μm, and a difference in particle size D90 ranging from 3 μm to 5 μm, a Li-ion cell consisted of a cathode active material layer made of a small particle size active material can improve a defect of low rate of a Li-ion cell consisted of a cathode active material layer made of a large particle size active material. In addition, each of the first active material layer 114 and the second active material layer 115 is made of active materials of various particle size ranges, which can improve a vibrational density.

It is noted that, in the implementations of the disclosure, a particle size of the active material of the first active material layer 114 can be larger than or smaller than a particle size of the active material of the second active material layer 115, as long as the active material of the first active material layer 114 and the active material of the second active material layer 115 have a difference in particle size D10 ranging from 0.05 μm to 0.3 μm, a difference in particle size D50 ranging from 1 μm to 4 μm, and a difference in particle size D90 ranging from 3 μm to 5 μm.

In an implementation, the active material of the first positive active material layer 114 and the active material of the second positive active material layer 115 has a difference in particle size D10 of 0.05 μm, 0.08 μm, 0.1 μm, 0.2 μm, or 0.3 μm.

In an implementation, the active material of the first positive active material layer 114 and the active material of the second positive active material layer 115 has a difference in particle size D50 of 1 μm, 2 μm, 3 μm, or 4 μm. In an implementation, the active material of the first positive active material layer 114 and the active material of the second positive active material layer 115 has a difference in particle size D90 of 3 μm, 4 μm, or 5 μm.

In one possible implementation, the active materials of the first active material layer 114 and the second active material layer 115 are lithium iron phosphate, part or all of the lithium iron phosphate is covered with a carbon coating layer on its surface, and a difference in carbon coating volume of the lithium iron phosphate between the first active material layer 114 and the second active material layer 115 is greater than or equal to 0.1%, where the carbon coating volume is a ratio of a weight of the carbon coating layer to a weight of the carbon coating layer and the lithium iron phosphate.

The lithium iron phosphate is coated with carbon on the surface thereof, which can improve a conductivity of the active material of each of the first active material layer 114 and the second active material layer 115, an electronic conductivity is improved, the rate is good, and the overall electrical performance of the battery structure is good. In an implementation, a difference in carbon coating volume of the lithium iron phosphate between the first active material layer 114 and the second active material layer 115 is greater than or equal to 0.1%, which can fully guarantee differences of the Li-ion cells. It should be noted that, in the implementations of the disclosure, the carbon coating volume of the lithium iron phosphate of the first active material layer 114 may be greater than or less than the carbon coating volume of the lithium iron phosphate of the second active material layer 115.

In an implementation, the weight of the carbon coating layer is 0.8-1.6% of a total weight of the carbon coating layer and the lithium iron phosphate, such as 0.8%, 0.9%, 1.0%, 1.2%, 1.4%, 1.5%, or 1.6%.

In one possible implementation, a difference in specific surface area between the active material of the first active material layer 114 and the active material of the second active material layer 115 ranges from 0.1 m²/g to 8 m²/g.

A specific surface area of particles is equal to a total surface of the particles divided by a total mass of the particles, then a larger the specific surface area of the particles corresponds to a smaller particle size, and ions have more entry paths, so the rate is good. However, a larger specific surface area results in more lithium ions being consumed to form a solid electrolyte interface (SEI) film, and thus a first time efficiency is low. In the implementations of the disclosure, the difference in specific surface area between the active material of the first active material layer 114 and the active material of the second active material layer 115 ranges from 0.1 m²/g to 8 m²/g, which can not only ensure that the two Li-ion cells are different, but also a Li-ion cell consisted of the positive active material layer of the active material with a small specific surface area and a Li-ion cell consisted of the positive active material layer of the active material with a large specific surface area may be complementary in terms of performance, and the entire electrode assembly has both a good rate and a good first-time efficiency. It should be noted that, in the implementations of the disclosure, the specific surface area of the first active material layer 114 may be greater than or less than the specific surface area of the active material of the second active material layer 115.

In an example, the difference in specific surface area between the active material of the first active material layer 114 and the active material of the second active material layer 115 is 0.1 m²/g, 0.5 m²/g, 1 m²/g, 2 m²/g, 3 m²/g, 4 m²/g, 5 m²/g, 6 m²/g, 7 m²/g, or 8 m²/g.

In one possible implementation, a difference in capacity per gram between the active material of the first active material layer 114 and the active material of the second active material layer 115 ranges from 10 mAh/g to 60 mAh/g.

A high capacity per gram of the active material can reduce a coating thickness, which can low a technological difficulty and improves an energy density. For the same kind of the active material, a smaller capacity per gram resulted in an increased coating thickness, a lower the energy density of the electrode assembly, but generally a lower cost. In the implementations of the disclosure, the difference in capacity per gram between the active material of the first active material layer 114 and the active material of the second active material layer 115 ranges from 10 mAh/g to 60 mAh/g, which can not only ensure that the two Li-ion cells are different, but also a Li-ion cell consisted of the positive active material layer of the active material with small capacity per gram and a Li-ion consisted of the positive active material layer of the active material with large capacity per gram may be complementary in terms of performance, and the entire electrode assembly has not only a high discharge rate, but also a high initial energy density and a suitable cost. It should be noted that, in the implementations of the disclosure, the capacity per gram of the first active material layer 114 may be greater than or less than the capacity per gram of the active material of the second active material layer 115.

In an example, the difference in capacity per gram between the active material of the first active material layer 114 and the active material of the second active material layer 115 is 10 mAh/g, 20 mAh/g, 30 mAh/g, 40 mAh/g, 50 mAh/g, or 60 mAh/g.

In an implementation, a difference in compacted density between the first active material layer 114 and the second active material layer 115 is greater than or equal to 0.02 g/cm, for example, 0.02 g/cm³, 0.04 g/cm³, 0.06 g/cm³, 0.08 g/cm³, 0.10 g/cm³, 0.15 g/cm³, or 0.20 g/cm³.

In one possible implementation, a thickness difference between the first conductive layer 112 and the second conductive layer 113 ranges from 0.1 μm to 1 μm, for example, 0.1 μm, 0.3 μm, 0.5 μm, 0.8 μm, or 1 μm. A thickness of each of the first conductive layer 112 and the second conductive layer 113 ranges from 0.1 μm to 3 μm, for example, 0.1 μm, 0.5 μm, 1 μm, 2 μm, or 3 μm.

In one possible implementation, a thickness difference between the first active material layer 114 and the second active material layer 115 ranges from 5 μm to 50 μm, for example, 5 μm, 10 μm, 20 μm, 30 μm, 40 μm, or 50 μm.

The thickness of each of the first conductive layer 112, the second conductive layer 113, the first active material layer 114, and the second active material layer 115 will affects the process difficulty. If the thickness is excessively large, it is not easy to dry, the coating efficiency is low, and cracks are easy to occur. In the implementations of the disclosure, the first conductive layer, the second conductive layer, the first active material layer 114, and the second active material layer 115 are of suitable thickness, the path of ion migration into the internal active material is short, the polarization is small, which is beneficial to improving charging and discharging rates, the DCR is small, and the cycling performance is good.

Implementations in which the active material of the first active material layer 114 and the active material of the second active material layer 115 are different kinds of materials will be descried below. When the kinds of active materials of the first active material layer 114 and the second active material layer 115 are different, the difference between the first active material layer 114 and the second active material layer 115 can be achieved by any one or more of the following implementations.

In an example, the active material of first active material layer 114 is lithium iron phosphate, and the active material of second active material layer 115 is monocrystalline nickel-cobalt lithium manganate. In an example, the active material of the first active material layer 114 is lithium iron phosphate, and the active material of the second active material layer 115 is polycrystalline nickel-cobalt lithium manganate. In an example, the active material of the first active material layer 114 is monocrystalline nickel-cobalt lithium manganate, and the active material of the second active material layer 115 is lithium iron phosphate. In an example, the active material of the first active material layer 114 is monocrystalline nickel-cobalt lithium manganate, and the active material of the second active material layer 115 is polycrystalline nickel-cobalt lithium manganate. In an example, the active material of the first active material layer 114 is polycrystalline nickel-cobalt lithium manganate, and the active material of the second active material layer 115 is monocrystalline nickel-cobalt lithium manganate.

In one possible implementation, the active material of the first active material layer 114 and the active material of the second active material layer 115 have a difference in particle size D10 ranging from 1 μm to 3 μm, a difference in particle size D50 ranging from 2 μm to 5 μm, and a difference in particle size D90 ranging from 3 μm to 25 μm.

An active material with a large particle size has long ion migration path but a low rate, and an active material with a small particle size has a good rate and is not easy to form dead zone inside particles and has long cycle life. In case that the active material of the first active material layer 114 and the active material of the second active material layer 115 are different kinds of material, by setting the active material of the first active material layer 114 and the active material of the second active material layer 115 to have a difference in particle size D10 ranging from 1 μm to 3 μm, a difference in particle size D50 ranging from 2 μm to 5 μm, and a difference in particle size D90 ranging from 3 μm to 25 μm, a Li-ion cell consisted of a cathode active material layer made of a small particle size active material can improve a defect of low rate of a Li-ion cell consisted of a cathode active material layer made of a large particle size active material. It is noted that, in the implementations of the disclosure, the particle size of the active material of the first active material layer 114 can be larger than or smaller than the particle size of the active material of the second active material layer 115.

In an example, the active material of the first positive active material layer 114 and the active material of the second positive active material layer 115 has a difference in particle size D10 of 1 μm, 1.5 μm, 2 μm, 2.5 μm, or 3 μm.

In an example, the active material of the first positive active material layer 114 and the active material of the second positive active material layer 115 has a difference in particle size D50 of 2 μm, 2.5 μm, 3 μm, 3.5 μm, 4 μm, or 5 μm.

In an example, the active material of the first positive active material layer 114 and the active material of the second positive active material layer 115 has a difference in particle size D90 of 3 μm, 5 μm, 8 μm, 10 μm, 13 μm, 15 μm, 20 μm, or 25 μm.

In one possible implementation, the difference in specific surface area between the active material of the first active material layer 114 and the active material of the second active material layer 115 ranging from 7 $m^2/g$ to 15 $m^2/g$.

A larger the specific surface area of the particles corresponds to a smaller particle size, and ions have more entry paths, so the rate is good. However, a larger specific surface area results in more lithium ions being consumed to form a solid electrolyte interface (SEI) film, and thus a first time efficiency is low. In the implementations of the disclosure, in case that the active material of the first active material layer 114 and the active material of the second active material layer 115 are different kinds of material, the difference in specific surface area between the active material of the first active material layer 114 and the active material of the second active material layer 115 ranges from 7 $m^2/g$ to 15 $m^2/g$, which can not only ensure that the two Li-ion cells are different, but also a Li-ion cell consisted of the positive active material layer of the active material with a small specific surface area and a Li-ion cell consisted of the positive active material layer of the active material with a large specific surface area may be complementary in terms of performance, and the entire electrode assembly has both a good rate and a good first-time efficiency.

In an example, a difference in specific surface area between the active material of the first active material layer 114 and the active material of the second active material layer 115 is 7 $m^2/g$, 8 $m^2/g$, 9 $m^2/g$, 10 $m^2/g$, 11 $m^2/g$, 12 $m^2/g$, 13 $m^2/g$, 14 $m^2/g$, or 15 $m^2/g$.

In one possible implementation, a difference in capacity per gram between the active material of the first active material layer 114 and the active material of the second active material layer 115 ranges from 20 mAh/g to 110 mAh/g.

In the implementations of the disclosure, in case that the active material of the first active material layer 114 and the active material of the second active material layer 115 are different kinds of material, the difference in capacity per gram between the active material of the first active material layer 114 and the active material of the second active material layer 115 ranges from 20 mAh/g to 110 mAh/g, which can not only ensure that the two Li-ion cells are different, but also a Li-ion cell consisted of the positive active material layer of the active material with a small capacity per gram and a Li-ion cell consisted of the positive active material layer of the active material with a large capacity per gram may be complementary in terms of performance, and the entire electrode assembly has both a good discharging rate and a high energy density.

In an example, the difference in capacity per gram between the active material of the first active material layer 114 and the active material of the second active material layer 115 is 20 mAh/g, 30 mAh/g, 40 mAh/g, 50 mAh/g, 60 mAh/g, 70 mAh/g, 80 mAh/g, 90 mAh/g, 100 mAh/g, or 110 mAh/g.

A difference in compacted density between the first active material layer 114 and the second active material layer 115 is greater than or equal to 0.8 $g/cm^3$, for example, 0.8 $g/cm^3$, 1 $g/cm^3$, 1.5 $g/cm^3$, or 2 $g/cm^3$.

In one possible implementation, a thickness difference between the first conductive layer 112 and the second conductive layer 113 ranges from 0.1 μm to 1.8 μm, for example, 0.1 μm, 0.3 μm, 0.5 μm, 0.8 μm, 1 μm, 1.5 μm, or 1.8 μm. In one possible implementation, a thickness difference between the first active material layer 114 and the second active material layer 115 ranges from 5 μm to 50 μm, for example, 5 μm, 10 μm, 20 μm, 30 μm, 40 μm, or 50 μm.

Each of the first conductive layer 112 and the second conductive layer 113 has a thickness ranging from 0.1 μm to 3 μm, for example, 0.1 μm, 0.5 μm, 1 μm, 2 μm, or 3 μm.

The thickness of each of the first conductive layer 112, the second conductive layer 113, the first active material layer 114, and the second active material layer 115 will affects the process difficulty. If the thickness is excessively large, it is not easy to dry, the coating efficiency is low, and cracks are easy to occur. In the implementations of the disclosure, the first conductive layer, the second conductive layer, the first active material layer 114, and the second active material layer 115 are of suitable thickness, the path of ion migration into the internal active material is short, the polarization is small, which is beneficial to improving charging and discharging rates, the DCR is small, and the cycling performance is good.

Implementations of the disclosure in which the third active material layer 124 is different from fourth active material layer 125 are described in detail hereinafter.

When the first active material layer 114 is different from the second active material layer 115, the third active material layer 124 may be the same as or different from the fourth active material layer 125. When the third active material layer 124 is different from the second active material layer 115, it can be that the third active material layer 124 is different from the second active material layer 115 in kind of active material, or the third active material layer 124 is the same as the second active material layer 115 in kind of active material but different from the second active material layer 115 in particle size, specific surface area, capacity per gram, and the like.

No matter whether a kind of the active material of the third active material layer 124 is the same as or different from a kind of the active material of the fourth active material layer 125, the active material of third active material layer 124 can be selected from graphite, silica carbon, or mesocarbon microbeads, and the active material of fourth active material layer 125 can also be selected from graphite, silica carbon, or mesocarbon microbeads.

In an example, the graphite in the implementations of the disclosure has a particle size D10 greater than 4 μm, a particle size D50 ranging from 7 μm to 15 μm, and a particle size D90 less than or equal to 30 μm. In an example, the graphite has a specific surface area ranging from 0.5 m$^2$/g to 8 m$^2$/g, a capacity per gram ranging from 250 mAh/g to 360 mAh/g, a coating amount ranging from 5 mg/cm$^2$ to 15 mg/cm$^2$, and a compacted density ranging from 1.1 g/cm$^3$ to 1.8 g/cm$^3$.

In an example, the silica carbon in the implementations of the disclosure has a particle size D10 ranging from 1 μm to 4 μm, a particle size D50 ranging from 4 μm to 8 μm, and a particle size D90 ranging from 9 μm to 12 μm. In an example, the silica carbon has a specific surface area ranging from 0.5 m$^2$/g to 8 m$^2$/g, a capacity per gram ranging from 360 mAh/g to 1000 mAh/g, a coating amount ranging from 5 mg/cm$^2$ to 10 mg/cm$^2$, and a compacted density ranging from 1.1 g/cm$^3$ to 2 g/cm$^3$.

In an example, the mesocarbon microbeads in the implementations of the disclosure have a particle size D10 greater than 4 μm, a particle size D50 ranging from 7 μm to 15 μm, and a particle size D90 less than or equal to 30 μm. In an example, the mesocarbon microbeads have a specific surface area ranging from 0.5 m$^2$/g to 4 m$^2$/g, a capacity per gram ranging from 200 mAh/g to 400 mAh/g, a coating amount ranging from 5 mg/cm$^2$ to 10 mg/cm$^2$, and a compacted density ranging from 1 g/cm$^3$ to 2 g/cm$^3$.

In an example, when the kind of the active material of the third active material layer 124 is the same as the kind of the active material of the fourth active material layer 125, a difference in particle size D10 between the active material of the third active material layer 124 and the active material of the fourth active material layer 125 ranges from 0.1 μm to 4 μm, a difference in particle size D50 between the active material of the third active material layer 124 and the active material of the fourth active material layer 125 ranges from 0.1 μm to 8 μm, and a difference in particle size D90 between the active material of the third active material layer 124 and the active material of the fourth active material layer 125 ranges from 0.1 μm to 10 μm.

In an implementation, when the kind of the active material of the third active material layer 124 is the same as the kind of the active material of the fourth active material layer 125, a difference in specific surface area between the active material of the third active material layer 124 and the active material of the fourth active material layer 125 ranges from 0.2 m$^2$/g to 8 m$^2$/g, for example, 0.2 m$^2$/g, 0.5 m$^2$/g, 1 m$^2$/g, 2 m$^2$/g, 3 m$^2$/g, 4 m$^2$/g, 5 m$^2$/g, 6 m$^2$/g, 7 m$^2$/g, or 8 m$^2$/g.

In an implementation, when the kind of the active material of the third active material layer 124 is the same as the kind of the active material of the fourth active material layer 125, a difference in capacity per gram between the active material of the third active material layer 124 and the active material of the fourth active material layer 125 ranges from 10 mAh/g to 100 mAh/g, for example, 10 mAh/g, 20 mAh/g, 30 mAh/g, 40 mAh/g, 50 mAh/g, 60 mAh/g, 70 mAh/g, 80 mAh/g, 90 mAh/g, 100 mAh/g.

In an implementation, when the kind of the active material of the third active material layer 124 is the same as the kind of the active material of the fourth active material layer 125, a difference in compacted density between the active material of the third active material layer 124 and the active material of the fourth active material layer 125 ranges from 0.1 g/cm$^3$ to 1.8 g/cm$^3$, for example, 0.1 g/cm$^3$, 0.3 g/cm$^3$, 0.5 g/cm$^3$, 0.8 g/cm$^3$, 1.0 g/cm$^3$, 1.1 g/cm$^3$, 1.3 g/cm$^3$, 1.5 g/cm$^3$, or 1.8 g/cm$^3$.

In an implementation, each of the third conductive layer 122 and the fourth conductive layer 123 has a thickness ranging from 0.1 μm to 2 μm. When the kind of the active material of the third active material layer 124 is the same as the kind of the active material of the fourth active material layer 125, a thickness difference between the third conductive layer 122 and the fourth conductive layer 123 ranges from 0.1 μm to 1 μm. In an example, a thickness difference between the third active material layer 124 and the fourth active material layer 125 ranges from 5 μm to 100 μm.

When the kind of the active material of the third active material layer 124 is different from the kind of the active material of the fourth active material layer 125, the third active material layer 124 and the fourth active material layer 125 can be implemented as follows. The third active material layer 124 is made of graphite and the fourth active material layer 125 is made of silica carbon; or, the third active material layer 124 is made of silica carbon and the fourth active material layer 125 is made of graphite; or, the third active material layer 124 is made of silica carbon and the fourth active material layer 125 is made of mesocarbon microbeads.

In an example, when the kind of the active material of the third active material layer 124 is different from the kind of the active material of the fourth active material layer 125, a difference in particle size D10 between the active material of the third active material layer 124 and the active material of the fourth active material layer 125 ranges from 0.1 μm to 4 µm, a difference in particle size D50 between the active material of the third active material layer 124 and the active material of the fourth active material layer 125 ranges from 0.1 µm to 10 µm, and a difference in particle size D90 between the active material of the third active material layer 124 and the active material of the fourth active material layer 125 ranges from 0.1 µm to 20 µm.

In an implementation, a difference in specific surface area between the active material of the third active material layer 124 and the active material of the fourth active material layer 125 ranges from 0.5 m²/g to 8 m²/g, for example, 0.5 m²/g, 1 m²/g, 2 m²/g, 3 m²/g, 4 m²/g, 5 m²/g, 6 m²/g, 7 m²/g, or 8 m²/g.

In an implementation, a difference in capacity per gram between the active material of the third active material layer 124 and the active material of the fourth active material layer 125 ranges from 10 mAh/g to 200 mAh/g, for example, 10 mAh/g, 20 mAh/g, 30 mAh/g, 40 mAh/g, 50 mAh/g, 60 mAh/g, 70 mAh/g, 80 mAh/g, 90 mAh/g, 100 mAh/g, 120 mAh/g, 150 mAh/g, 180 mAh/g, or 100 mAh/g.

In an implementation, a difference in compacted density between the active material of the third active material layer 124 and the active material of the fourth active material layer 125 ranges from 0.1 g/cm³ to 1.8 g/cm³, for example, 0.1 g/cm³, 0.3 g/cm³, 0.5 g/cm³, 0.8 g/cm³, 1.0 g/cm³, 1.1 g/cm³, 1.3 g/cm³, 1.5 g/cm³, or 1.8 g/cm³.

In an implementation, when the kind of the active material of the third active material layer 124 is different from the kind of the active material of the fourth active material layer 125, a thickness difference between the third conductive layer and the fourth conductive layer ranges from 0.1 µm to 1.8 µm. In an example, a thickness difference between the third active material layer 124 and the fourth active material layer 125 ranges from 5 µm to 100 µm.

Arrangements of tabs of the electrode assembly 10 in the implementations of the disclosure are described hereinafter.

In an example, as illustrated in the electrode assembly of FIG. 1, the third active material layer 124 is separated from first active material layer 114 adjacent to the third active material layer 124 by the first separator 13. The second active material layer 115 is separated from the fourth active material layer 125 adjacent to the second active material layer 115 by the second separator 14. In an implementation, the electrode assembly 10 has four tabs, and the four tabs are the first tab 151, the second tab 152, the third tab 153, and the fourth tab 154 (as illustrated in FIG. 9).

The electrode assembly 10 of the present disclosure is described in further detail below in conjunction with the implementations.

Implementation 1

A wound electrode assembly provided in this implementation includes a positive electrode and a negative electrode.

The positive electrode includes a first insulating layer, a first conductive layer on one surface of the first insulating layer and a second conductive layer on the other surface of the first insulating layer, a first active material layer on a surface of the first conductive layer, and a second active material layer on a surface of the second conductive layer. The first tab and the second tab are staggered. A part of the first conductive layer and a part of the first insulating layer extend to form the first tab. A part of the second conductive layer and a part of the first insulating layer extend to form the second tab.

The negative electrode includes a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer. The third tab and the fourth tab are staggered. A part of the third conductive layer and a part of the second insulating layer extend to form the third tab. A part of the fourth conductive layer and a part of the second insulating layer extend to form the fourth tab.

The first tab and the fourth tab are arranged at one side of a symmetry plane of the electrode assembly 10, and the second tab and the third tab are arranged at the other side of the symmetry plane. The first tab is disposed between the second tab and the third tab in a length direction of the electrode assembly 10.

In the positive electrode and the negative electrode adjacently arranged, the third active material layer is close to the first active material layer, the second active material layer is close to the fourth active material layer. The third active material layer is separated from the first active material layer adjacent to the third active material layer by the first separator. The second active material layer is separated from the fourth active material layer adjacent to the second active material layer by the second separator.

A capacity ratio (i.e., $CB_1$ value) of the third active material layer to the first active material layer is 1.1, and a capacity ratio (i.e., $CB_2$ value) of the fourth active material layer to the second active material layer is 1.1.

In an implementation, specific parameters of each of the active material of the first active material layer, the second active material layer, the first negative-electrode active material layer, and the fourth active material layer are illustrated in Table 1 and Table 2.

It should be noted that, for an aspect which is not specified in this implementation, the first active material layer is the same as the second active material layer in this aspect, the third active material layer is the same as the fourth active material layer in this aspect.

Implementation 2

A wound electrode assembly provided in implementation 2 is the same as the wound electrode assembly in implementation 1 in structure, except that active materials of the first active material layer and second active material layer in implementation 2 are different from those in implementation 1, and active materials of the third active material layer and the fourth active material layer are different from those in implementation 1. Setting conditions of the first active material layer and the second active material layer are recorded in Table 1, and setting conditions of the active materials of the third active material layer and the fourth active material layer are recorded in Table 2.

Comparative Example 1

A wound electrode assembly provided in comparative example 1 is the same as the wound electrode assembly in implementation 1, except that the lithium iron phosphate in the second active material layer in comparative example 1 has the particle size D10 of 0.6 µm, the particle size D50 of 2.8 µm, the particle size D90 of 9.6 µm, the specific surface area of 12 m²/g, the capacity per gram of 146 mAh/g, the coating amount of 20 mg/cm², and the compacted density of 2.35 g/cm³, the weight of the carbon coating layer being 0.8% of the total weight of the carbon coating layer and the lithium iron phosphate.

TABLE 1 part parameters of the first active material layer and the second active material
layer in implementation 1, implementation 2, and comparative example 1.

| | | Composition | Specific surface area m²/g | Capacity per gram Ah/g | Particle size distribution (μm) | Carbon coating volume | Coating amount g/cm² | Compacted density g/cm³ |
|---|---|---|---|---|---|---|---|---|
| Implementation 1 | First active material layer | lithium iron phosphate | 12 | 146 | D10 is 0.6 D50 is 2.8 D90 is 9.6 | 0.80% | 20 | 2.35 |
| | Second active material layer | lithium iron phosphate | 15.6 | 158 | D10 is 0.4 D50 is 1.5 D90 is 4.3 | 1.50% | 20 | 2.35 |
| Implementation 2 | First active material layer | lithium iron phosphate | 12 | 146 | D10 is 0.6 D50 is 2.8 D90 is 9.6 | 0.80% | 20 | 2.35 |
| | Second active material layer | polycrystalline nickel-cobalt manganese (811 system) | 0.4 | 208 | D10 is 3.8 D50 is 10.3 D90 is 31.2 | — | 24.3 | 3.45 |
| Comparative example 1 | First active material layer | lithium iron phosphate | 12 | 146 | D10 is 0.6 D50 is 2.8 D90 is 9.6 | 0.80% | 20 | 2.35 |
| | Second active material layer | lithium iron phosphate | 12 | 146 | D10 is 0.6 D50 is 2.8 D90 is 9.6 | 0.80% | 20 | 2.35 |

TABLE 2 part parameters of the third active material layer and the fourth active material
layer in implementation 1, implementation 2, and comparative example 1.

| | | Composition | Specific surface area m²/g | Capacity per gramm Ah/g | Particle size distribution (μm) | Thickness (μm) |
|---|---|---|---|---|---|---|
| Implementation 1 | Third active material layer | graphite | 1.3 | 340 | D10 is 5.2 D50 is 16.6 D90 is 45 | — |
| | Fourth active material layer | mesocarbon microbeads | 2.4 | 350 | D10 is 7 D50 is 12 D90 is 18.4 | — |
| | First conductive layer | — | — | — | — | 1 |
| | Second conductive layer | — | — | — | — | 1.1 |
| Implementation 2 | Third active material layer | graphite | 1.3 | 146 | D10 is 5.2 D50 is 16.6 D90 is 45 | — |
| | Fourth active material layer | Silica carbon | 2.5 | 680 | D10 is 9 D50 is 18 D90 is 18 | — |
| | First conductive layer | — | — | — | — | 1 |
| | Second conductive layer | — | — | — | — | 1.1 |
| Comparative example 1 | Third active material layer | graphite | 1.3 | 340 | D10 is 5.2 D50 is 16.6 D90 is 45 | — |
| | Fourth active material layer | graphite | 1.3 | 340 | D10 is 5.2 D50 is 16.6 D90 is 45 | — |
| | First conductive layer | — | — | — | — | 1 |
| | Second conductive layer | — | — | — | — | 1.1 |

Test Example

A discharge capacity ratio of 3 C discharge rate at 25° C. (a ratio of discharge capacity to rated capacity), a weight energy density, a number of 75% capacity cycle, an operating temperature range, a DCR at voltage versus time (SOC) of 50% of each of the electrode assemblies in implementation 1, implementation 2, and comparative example 1 are tested. Results of the test are illustrated in Table 3. Here, the DCR at SOC of 50% is tested by using 3 C discharge rate at 25° C. and SOC of 50% for 30 S, and the DCR is obtained by calculation, where DCR=ohmic impedance+electrochemical impedance+concentration difference impedance.

with comparative example 1, an active material of the fourth active material layer is silicon carbide, which has a relatively high gram capacity, a reduced coating weight, and a reduced electrode thickness, such that an energy density is also improved in comparison with comparative example 1. Due to relatively large volume expansion and fragile particles in implementation 2 during a cycle process, a cycle performance is slightly degraded. In addition, compared with comparative example 1, an active material of the second active material layer is polycrystalline nickel-cobalt manganese and thus has a good conductivity, which is beneficial to reducing an ohmic impedance, as well as increasing a thickness of the second conductive layer to improve its overcurrent capacity, such that an overall ohmic impedance

TABLE 3 performance test results of the electrode assemblies in implementation
1, implementation 2, and comparative example 1.

|  | Discharge capacity ratio of 3 C discharge rate at 25° C. | Weight energy density wh/kg | number of 75% capacity cycle/times | Operating temperature range/° C. | DCR at SOC of 50%/mΩ |
|---|---|---|---|---|---|
| Implementation 1 | 95% | 182.8 | 10000 | −30~60 | 0.412 |
| Implementation 2 | 92% | 195.8 | 4800 | −30~60 | 0.408 |
| Comparative example 1 | 90% | 176.4 | 6500 | −20~60 | 0.436 |

Compared with comparative example 1, in implementation 1, the second active material layer has a small particle size, a large specific surface area, a short electron migration path, and a large carbon coating volume. The active material of the fourth active material layer is mesocarbon microbead, which has a large gram capacity, a good isotropy, such that implementation 1 has a greater rate than comparative example 1, a cycle life is significantly prolonged, and a low-temperature operating range is widened to −30° C. In addition, compared with comparative example 1, the active material of the fourth active material layer has a smaller particle size, a better dynamic performance, smaller electrochemical impedance and concentration impedance, and thickness and ohmic impedance of the first conductive layer remains unchanged, therefore, overall DCR is reduced. In addition, a particle size distribution of mesocarbon microbeads of the fourth active material layer is relatively narrow and small, the thickness of the second conductive layer is increased, and DCR is also relatively small.

Compared with comparative example 1, an active material of the second active material layer in implementation 2 is polycrystalline nickel-cobalt manganese (811 system). Polycrystalline nickel-cobalt manganese has a much higher gram capacity and a much heavier unit weight than the lithium iron phosphate, thus has relatively large coating weight and compacted density, and eventually has a significantly improved gravimetric energy density. In addition, because the active material of the second active material layer has a relatively large particle size and a relatively small specific surface area, a cycle number is significantly reduced. Polycrystalline nickel-cobalt manganese has a good conductivity and needs no carbon coating, which improves an overall improvement in rate performance. Polycrystalline nickel-cobalt manganese has a relatively good performance at low temperatures, such that a range of operating temperature of an electrode assembly can be expanded to −25° C. in a low temperature region. Compared is significantly reduced. A combination of an electrochemical impedance and a concentration impedance of polycrystalline nickel-cobalt manganese is not greater than a combination of an electrochemical impedance and a concentration impedance of lithium iron phosphate, such that overall DCR is significantly reduced. Compared with comparative example 1, a conductivity of a negative silicon carbide material in implementation 2 is slightly reduced (which will lead to growth of DCR), but the thickness of the conductive layer increases, such that a comprehensive effect is that the negative electrode has a slightly increased influence on DCR, but the positive electrode has a greater influence on DCR, therefore, overall DCR is reduced.

Figure 12:
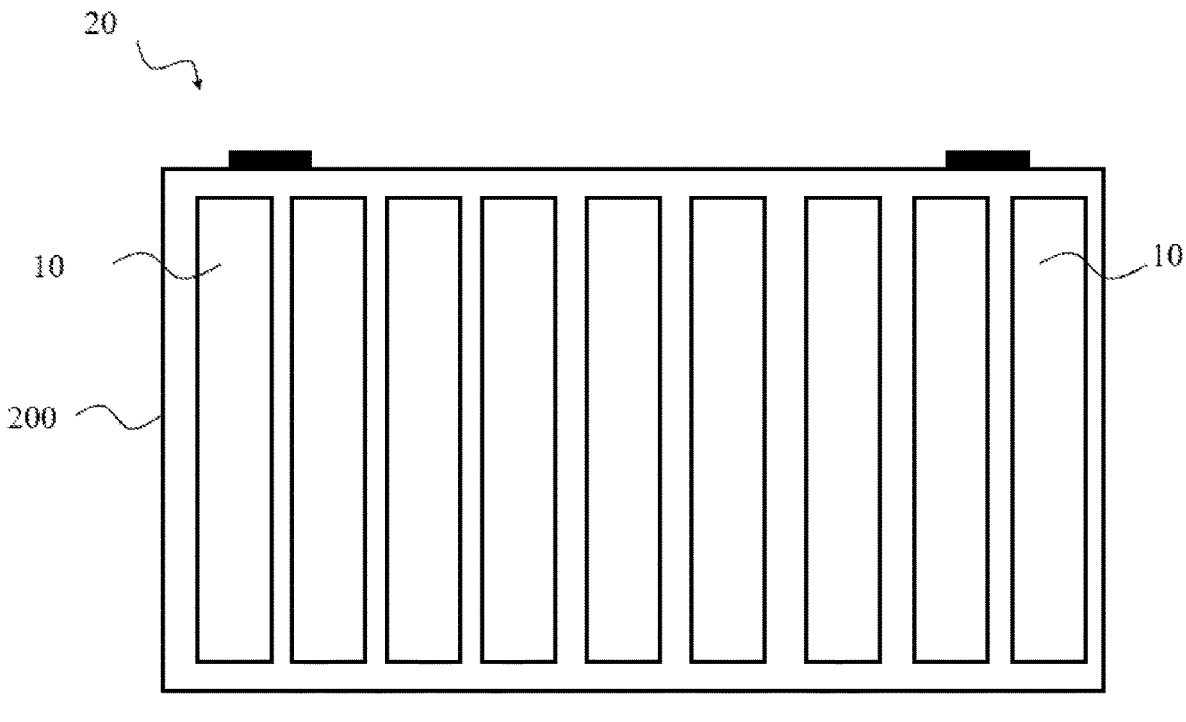
FIG. 12 illustrates a battery pack according to implementations of the disclosure.
Figure 13:
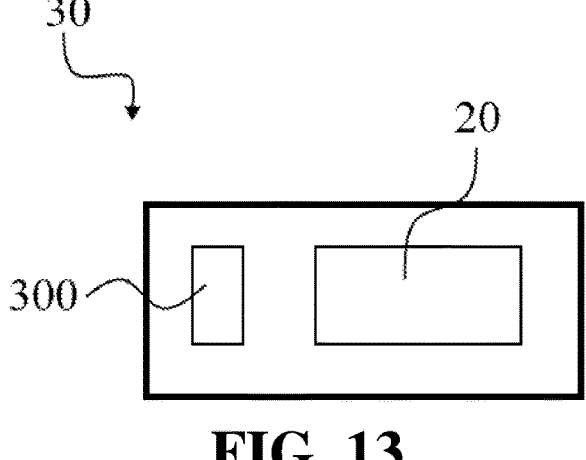
FIG. 13 illustrates a vehicle according to implementations of the disclosure.

In a second aspect, a battery pack 20 is provided. The battery pack 20 includes a battery box 200 and multiple electrode assemblies 10 provided in the first aspect, where the multiple electrode assemblies 10 are received in the battery box 200. In an example, the battery pack 20 is illustrated in FIG. 12.

In a third aspect, a vehicle 30 is provided. The vehicle 30 includes a processor 300 and a battery pack 20 provided in the second aspect. The battery pack 20 is electrically coupled with the processor 300. The processor 300 is configured to control charging and discharging of each of the multiple electrode assemblies 10.

The above are only preferred implementations of the disclosure, and are not used to limit the disclosure. For those of ordinary skill in the art, the disclosure may have various changes and modifications. Any modification, equivalent replacement, improvement, etc. made within the spirit and principles of this disclosure shall be included in the scope of protection of the disclosure.

What is claimed is:
1. An electrode assembly, comprising a positive electrode and a negative electrode, wherein:
the positive electrode comprises a first insulating layer, a first conductive layer on one surface of the first insu- lating layer and a second conductive layer on the other surface of the first insulating layer, a first active material layer on a surface of the first conductive layer, and a second active material layer on a surface of the second conductive layer;

the negative electrode comprises a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer;

the positive electrode and the negative electrode which are adjacent to each other are separated by a separator;

a current in the first conductive layer of the positive electrode is outputted through a first tab, and a current in the second conductive layer of the positive electrode is outputted through a second tab;

a current in the third conductive layer of the negative electrode is outputted through a third tab, and a current in the fourth conductive layer of the negative electrode is outputted through a fourth tab;

the first tab and the second tab are staggered, wherein a part of the first conductive layer and a part of the first insulating layer extend beyond the second conductive layer to form the first tab in a height direction of the electrode assembly, and a part of the second conductive layer and a part of the first insulating layer extend beyond the first conductive layer to form the second tab in the height direction of the electrode assembly;

the third tab and the fourth tab are staggered, wherein a part of the third conductive layer and a part of the second insulating layer extend beyond the fourth conductive layer to form the third tab in the height direction of the electrode assembly, and a part of the fourth conductive layer and a part of the second insulating layer extend beyond the third conductive layer to form the fourth tab in the height direction of the electrode assembly; and the electrode assembly has a symmetry plane that is parallel to the height direction and a length direction of the electrode assembly, an orthographic projection of the first tab on the symmetry plane, an orthographic projection of the second tab on the symmetry plane, an orthographic projection of the third tab on the symmetry plane, and an orthographic projection of the fourth tab on the symmetry plane are spaced apart from one another.

2. The electrode assembly of claim 1, wherein the first tab, the second tab, the third tab, and the fourth tab are arranged at a same side in the height direction of the electrode assembly.

3. The electrode assembly of claim 1, wherein two of the first tab, the second tab, the third tab, and the fourth tab are arranged at one side of the electrode assembly in the height direction of the electrode assembly, and the other two of the first tab, the second tab, the third tab, and the fourth tab are arranged at the other side in the height direction of the electrode assembly.

4. The electrode assembly of claim 2, wherein:
the electrode assembly has a wound structure;
the first tab and the fourth tab are arranged at one side of the symmetry plane of the electrode assembly, and the second tab and the third tab are arranged at the other side of the symmetry plane; and the first tab is disposed between the second tab and the third tab in the length direction of the electrode assembly.

5. The electrode assembly of claim 3, wherein;
the electrode assembly has a wound structure;
the first tab and the fourth tab are arranged at one side of the symmetry plane of the electrode assembly, and the second tab and the third tab are arranged at the other side of the symmetry plane; and the first tab is disposed between the second tab and the third tab in the length direction of the electrode assembly.

6. The electrode assembly of claim 2, wherein:
the electrode assembly has a wound structure;
the second tab and the third tab are arranged at one side of the symmetry plane of the electrode assembly, and the first tab and the fourth tab are arranged at the other side of the symmetry plane; and the fourth tab is disposed between the second tab and the third tab in the length direction of the electrode assembly.

7. The electrode assembly of claim 3, wherein:
the electrode assembly has a wound structure;
the second tab and the third tab are arranged at one side of the symmetry plane of the electrode assembly, and the first tab and the fourth tab are arranged at the other side of the symmetry plane; and the fourth tab is disposed between the second tab and the third tab in the length direction of the electrode assembly.

8. The electrode assembly of claim 2, wherein:
the electrode assembly has a wound structure;
the first tab and the second tab are arranged at one side of the symmetry plane of the electrode assembly, and the third tab and the fourth tab are arranged at the other side of the symmetry plane; and the third tab is disposed between the first tab and the second tab in the length direction of the electrode assembly.

9. The electrode assembly of claim 3, wherein:
the electrode assembly has a wound structure;
the first tab and the second tab are arranged at one side of the symmetry plane of the electrode assembly, and the third tab and the fourth tab are arranged at the other side of the symmetry plane; and the third tab is disposed between the first tab and the second tab in the length direction of the electrode assembly.

10. The electrode assembly of claim 2, wherein:
the electrode assembly has a wound structure;
the first tab and the second tab are arranged at one side of the symmetry plane of the electrode assembly, and the third tab and the fourth tab are arranged at the other side of the symmetry plane; and the first tab is disposed between the third tab and the second tab in the length direction of the electrode assembly.

11. The electrode assembly of claim 3, wherein;
the electrode assembly has a wound structure;
the first tab and the second tab are arranged at one side of the symmetry plane of the electrode assembly, and the third tab and the fourth tab are arranged at the other side of the symmetry plane; and the first tab is disposed between the third tab and the second tab in the length direction of the electrode assembly.

12. The electrode assembly of claim 2, wherein:

the electrode assembly has a wound structure; and the first tab, the second tab, the third lab, and the fourth lab are arranged at a same side of the symmetry plane of the electrode assembly.

13. The electrode assembly of claim 3, wherein:

the electrode assembly has a wound structure; and the first tab, the second tab, the third lab, and the fourth lab are arranged at a same side of the symmetry plane of the electrode assembly.

14. The electrode assembly of claim 1, wherein:

the first active material layer is different from the second active material layer; and/or the third active material layer is different from the fourth active material layer.

15. A battery pack, comprising a battery box and a plurality of electrode assemblies received in the battery box, each of the plurality of electrode assemblies comprising a positive electrode and a negative electrode, wherein:

the positive electrode comprises a first insulating layer, a first conductive layer on one surface of the first insulating layer and a second conductive layer on the other surface of the first insulating layer, a first active material layer on a surface of the first conductive layer, and a second active material layer on a surface of the second conductive layer;

the negative electrode comprises a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer;

the positive electrode and the negative electrode which are adjacent to each other are separated by a separator;

a current in the first conductive layer of the positive electrode is outputted through a first tab, and a current in the second conductive layer of the positive electrode is outputted through a second tab;

a current in the third conductive layer of the negative electrode is outputted through a third tab, and a current in the fourth conductive layer of the negative electrode is outputted through a fourth tab;

the first tab and the second tab are staggered, wherein a part of the first conductive layer and a part of the first insulating layer extend beyond the second conductive layer to form the first tab in a height direction of the electrode assembly, and a part of the second conductive layer and a part of the first insulating layer extend beyond the first conductive layer to form the second tab in the height direction of the electrode assembly;

the third tab and the fourth tab are staggered, wherein a part of the third conductive layer and a part of the second insulating layer extend beyond the fourth conductive layer to form the third tab in the height direction of the electrode assembly, and a part of the fourth conductive layer and a part of the second insulating layer extend beyond the third conductive layer to form the fourth tab in the height direction of the electrode assembly; and the electrode assembly has a symmetry plane that is parallel to the height direction and a length direction of the electrode assembly, an orthographic projection of the first tab on the symmetry plane, an orthographic projection of the second tab on the symmetry plane, an orthographic projection of the third tab on the symmetry plane, and an orthographic projection of the fourth tab on the symmetry plane are spaced apart from one another.

16. The battery pack of claim 15, wherein the first tab, the second tab, the third tab, and the fourth tab are arranged at a same side in the height direction of the electrode assembly.

17. The battery pack of claim 15, wherein two of the first tab, the second tab, the third tab, and the fourth tab are arranged at one side of the electrode assembly in the height direction of the electrode assembly, and the other two of the first tab, the second tab, the third tab, and the fourth tab are arranged at the other side in the height direction of the electrode assembly.

18. A vehicle, comprising a processor and a battery pack electrically coupled with the processor, the battery pack comprising a battery box and a plurality of electrode assemblies received in the battery box, the processor being configured to control charging and discharging of each of the plurality of electrode assemblies, and each of the plurality of electrode assemblies comprising a positive electrode and a negative electrode, wherein:

the positive electrode comprises a first insulating layer, a first conductive layer on one surface of the first insulating layer and a second conductive layer on the other surface of the first insulating layer, a first active material layer on a surface of the first conductive layer, and a second active material layer on a surface of the second conductive layer;

the negative electrode comprises a second insulating layer, a third conductive layer on one surface of the second insulating layer and a fourth conductive layer on the other surface of the second insulating layer, a third active material layer on a surface of the third conductive layer, and a fourth active material layer on a surface of the fourth conductive layer;

the positive electrode and the negative electrode which are adjacent to each other are separated by a separator;

a current in the first conductive layer of the positive electrode is outputted through a first tab, and a current in the second conductive layer of the positive electrode is outputted through a second tab;

a current in the third conductive layer of the negative electrode is outputted through a third tab, and a current in the fourth conductive layer of the negative electrode is outputted through a fourth tab;

the first tab and the second tab are staggered, wherein a part of the first conductive layer and a part of the first insulating layer extend beyond the second conductive layer to form the first tab in a height direction of the electrode assembly, and a part of the second conductive layer and a part of the first insulating layer extend beyond the first conductive layer to form the second tab in the height direction of the electrode assembly;

the third tab and the fourth tab are staggered, wherein a part of the third conductive layer and a part of the second insulating layer extend beyond the fourth conductive layer to form the third tab in the height direction of the electrode assembly, and a part of the fourth conductive layer and a part of the second insulating layer extend beyond the third conductive layer to form the fourth tab in the height direction of the electrode assembly; and the electrode assembly has a symmetry plane that is parallel to the height direction and a length direction of the electrode assembly, an orthographic projection of the first tab on the symmetry plane, an orthographic projection of the second tab on the symmetry plane, an orthographic projection of the third tab on the symmetry plane, and an orthographic projection of the fourth tab on the symmetry plane are spaced apart from one another.

19. The electrode assembly of claim 1, wherein any two of the first tab, the second tab, the third tab, and the fourth tab are located on one side of the symmetry plane, and the remaining two of the first tab, the second tab, the third tab, and the fourth tab are located on the other side of the symmetry plane.

20. The electrode assembly of claim 1, wherein all of the first tab, the second tab, the third tab, and the fourth tab are located on a same side of the symmetry plane.

\* \* \* \* \*